Oct. 31, 1967  J. M. W. CHAMBERLAIN  3,350,020
VIBRATORY MILL
Filed May 29, 1964  2 Sheets-Sheet 2
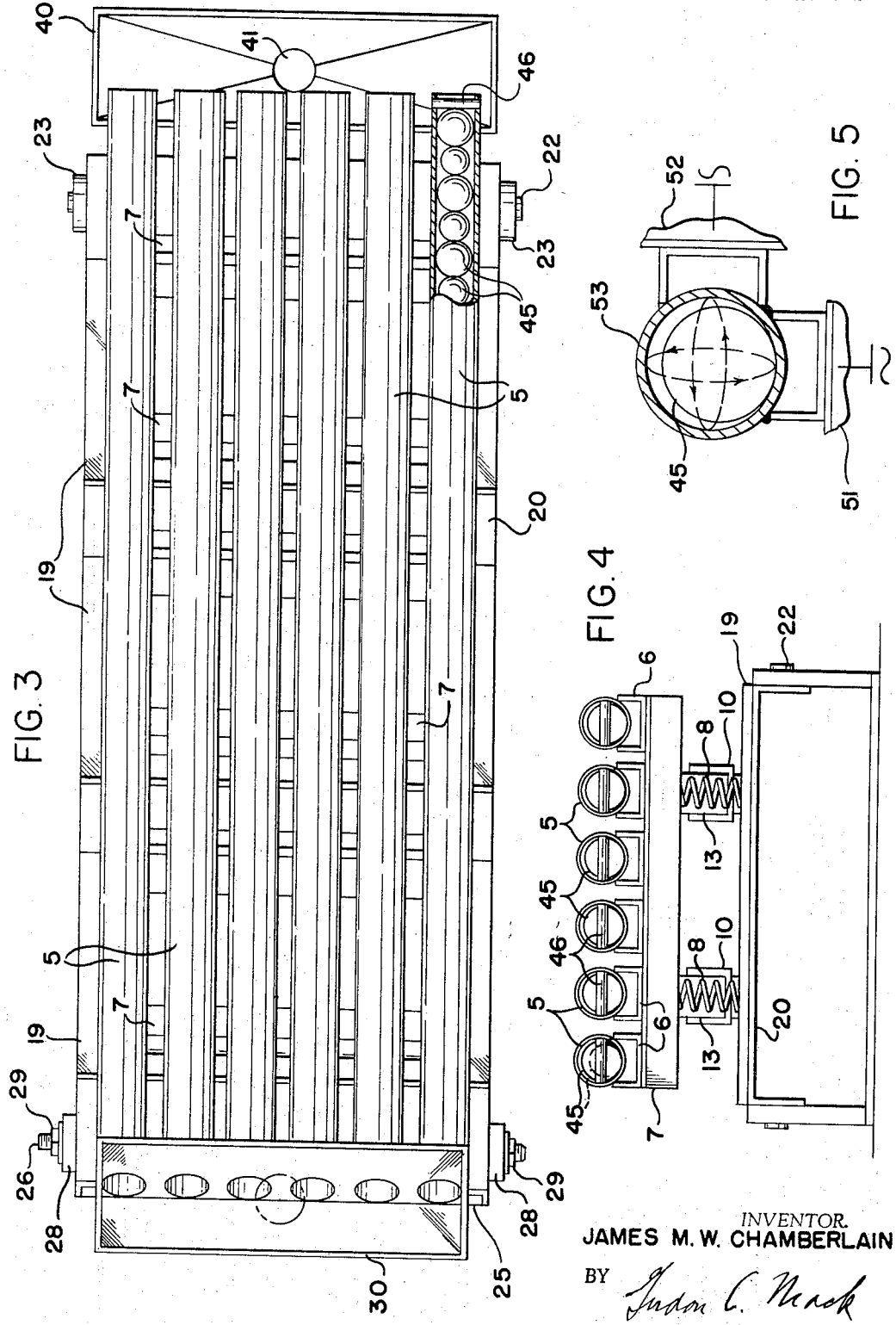
INVENTOR.
JAMES M. W. CHAMBERLAIN
BY
ATTORNEY US United States Patent Office 3,350,020
Patented Oct. 31, 1967

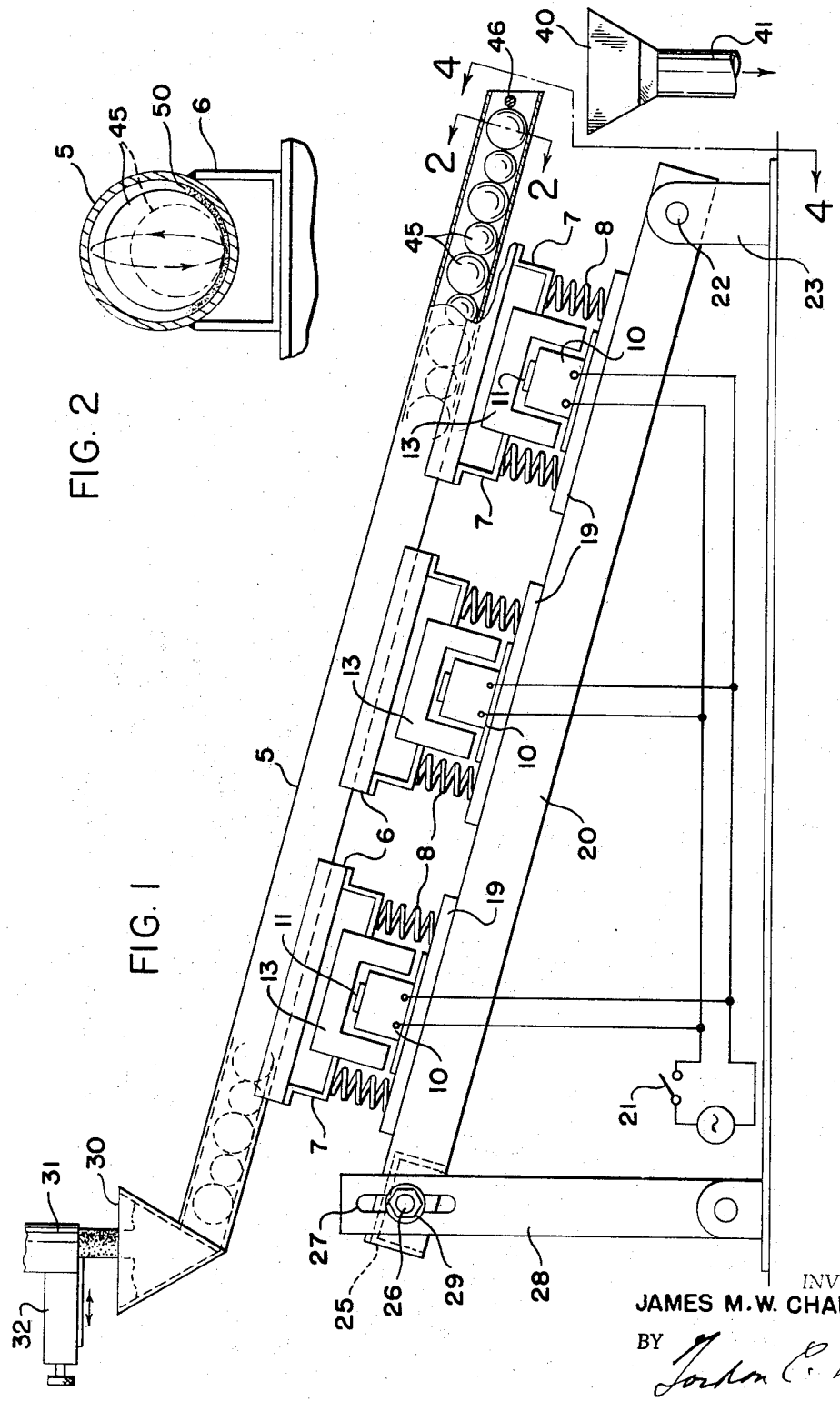

3,350,020
VIBRATORY MILL
James M. W. Chamberlain, Akron, Ohio, assignor, by mesne assignments, to U.S. Stoneware, Inc., a corporation of Massachusetts
Filed May 29, 1964, Ser. No. 371,241
6 Claims. (Cl. 241—137)

This invention relates to a vibratory mill for grinding particles of a solid.

In its preferred form the body of the mill is a pipe or a plurality of pipes. If more than one pipe is used, the pipes may be side by side in a single plane or they may be grouped in tiers at two or more levels, or arranged in any other desired manner. The pipe or pipes are generally straight and each is of substantially the same diameter throughout. The pipes are not necessarily cylindrical, and may be oval. They may vary in diameter, and balls of larger diameter might be located in a portion of larger diameter and balls of smaller diameter in a portion of smaller diameter. Several straight pipe sections may be connected by a section which is not straight, such as a return bend which connects the bottom end of a pipe slanted in one direction to the top of a pipe slanted in the opposite direction. The mill need not be formed from one or more pipes, but may be any body which comprises one or more comparable slanting passages therethrough. The angle at which the passage or passages through the mill body are slanted will depend upon the nature of the material being ground, how long it is desired to keep it in the mill (which in turn depends upon the length of the passages), etc. Usually an angle of about 35 to 45 degrees to the horizontal will be satisfactory.

In each pipe or the like there is a plurality of balls aligned in a single row in the bottom thereof, arranged in touching contact throughout substantially the whole length of each pipe. These remain in the pipe and are maintained in continual contact by gravity during any grinding operation. The material to be ground is fed into the upper end of the pipe continuously, or substantially so, and is discharged in finer particle size from the other end of the pipe, in a substantially continuous manner after passing around the balls.

The pipe is subjected to continuous, or substantially continuous vibration which causes rapidly repeated impacts of the balls against the particles of material to be ground as they flow through the pipe. It has been observed that most of the milling action in a vibratory ball mill or the like occurs between the balls and the wall of the mill. It is a surface action and does not occur in depth. There is therefore an advantage in having the balls aligned as proposed herein, in the concave bottom of the mill, rather than having them act in bulk.

The balls are large and heavy so that they have high inertia. The vibratory motion of the pipe may be orbital in the plane of the axis of the pipe, or it might be orbital in the plane at an angle to the axis, or it may be linear in a plane perpendicular to the axis of the pipe. Vibration in two lines at right angles to one another, in a plane perpendicular to the axis, preferably with a different amplitude in each line to give an elliptical orbit, is generally most efficient because it is most effective in preventing leakage of the material being ground around the balls within the pipe. The amplitude of the vibrations will generally be about 1/32 to 1/16 inch but this is not critical and the amplitude may be appreciably smaller, or greater. Likewise the rate of vibration is not critical and may be 20 to 60 per minute, more or less, so long as the vibration is rapid and sufficient to impart grinding impacts on the material to be ground. The pipe or other body is mounted so that there is a minimum of damping of the vibration.

The vibrator may be either a mechanical or electrical device.

If the straight passage through the mill is long, and is metal, the vibration is preferably timed so that the peak of the waves will progress down the tube at the same velocity as sound travels in the metal of the passage.

The size of the passage, i.e., the internal diameter of the pipe, if a pipe be used, is not critical. It may be one-half to three inches, or thereabout. If a pipe, it will usually be an iron pipe. It may be of other metal, or of ceramic or plastic composition. It must be impact resistant, and quite abrasion resistant. As some contamination of the material being ground will occur due to particles being worn from the passage, and also from the balls, the composition of the mill and the balls may be selected with this in mind. The balls will be only somewhat smaller than the internal diameter of the pipe, the measured difference depending upon the size of the pipe and the balls. They are never so small that two or more can become jammed side by side within the passage. Iron balls may be used, or balls of other metal or of ceramic or plastic composition. Ceramics and plastics will usually be weighted to increase their inertia and thus increase the impact. Balls of somewhat different diameters are more effective than balls which are all of the same size.

The invention is further described in connection with the accompanying drawings, in which—

FIGURE 1 is an elevation, partly in section, of a mill the body of which is formed of a series of parallel pipes;

FIGURE 2 is an enlarged section through a single pipe on the line 2—2 of FIGURE 1;

FIGURE 3 is a plan view of the equipment shown in FIGURE 1;

FIGURE 4 is a section on the line 4—4 of FIGURE 1; and

FIGURE 5 is a detail illustrating a modified arrangement of vibrating means.

The pipes 5, which may comprise any number from a single pipe to a very large number, are arranged parallel to one another. The individual pipes are supported in inverted channels 6 which are supported on Z-bar cross members 7 which rest on springs 8. The vibrators are formed of electromagnets 10 with cores 11 in which the magnetic flux alternates with alternations of the current. Z-bars 7 are welded to laminations 13 which vibrate toward and away from these cores, so channels 6 and pipes 5 vibrate with them. Springs 8 rest on plates 19 supported on member 20.

The switch 21 closes the circuit and puts the vibrators in motion. The bottom end of the support 20 rests on the pivot 22 the ends of which pass through the supports 23. The upper end of support 20 is supported by a long, heavy cross beam 25 with bolts 26 extending from its ends. These bolts are located in the slots 27 in the uprights 28 so that the angle of the pipes and therefore the dwell time within the mill, of the material to be ground, can easily be varied. By tightening the nuts 29 against uprights 28, the angle of the mill is fixed.

At the upper end of the pipes is a trough 30 supplied from any suitable source, such as the source 31 which is provided with a gate 32 or the like which slides in and out across the bottom of the source 31 to regulate the amount of solid particles delivered into the trough 30. The upper ends of the pipes 5 open into this trough 30.

The material to be ground, after passing through the pipes, is collected in the hopper 40 and delivered through the outlet 41 to containers or any suitable collection means.

The balls 45 located in the pipe may be all of the same size or they may be of somewhat different sizes. Pins 46 in the respective pipes, hold them in the pipes. The mill operates most efficiently when adjacent balls are not the same size. It is desirable to arrange larger and smaller balls alternately, as illustarted. The larger balls are just smaller in diameter than the pipes, and the smaller balls are only slightly smaller than the larger balls and not so small as to permit misalignment of the balls within the bottoms of the pipes.

As the vibrators are put in motion the balls are brought with considerable impact into contact with the particles of solid material 50 passing through the pipe around the balls. The impact is greatest if the inertia of the balls tends to keep them in one position. This automatically increases the frequency over which the mill will operate.

Although the hopper 30 is shown as supplying the material to be ground to all of the pipes, it is to be understood that the pipes may be fed from different sources and different materials may be fed to different pipes.

The motion of the vibrators 10 may be perpendicular to the support 20. By angling the vibrators, the slope of the passages can be compensated to increase or decrease the flow of the material therethrough.

FIGURE 5 shows a modified structure in which there are two vibrators 51 and 52 which are mounted to vibrate in perpendicular directions. In this modification, the vibrators are welded to the pipe 53 which is tilted at a desirable angle. The arrows indicate the planes of vibration and the amplitude of the two vibrators is preferably different. One vibration is in a plane perpendicular to the axis of the pipe, and the other is crosswise of the pipe. With this arrangement there is no uniform impact pattern within the pipes. This provides more efficient grinding than vibrators acting in a single plane.

Although usually balls will be employed as the grinding media, short cylinders may be used, and these might be used with balls as by alternating balls and short cylinders throughout the length of a mill passage.

The invention is covered in the claims which follow.

What I claim is:
1. A vibratory mill comprising at least one sloping, substantially straight section of tubular conduit of substantial length; a plurality of grinding media serially aligned within said conduit, each media being in contact with its adjacent media, said media extending substantially the entire length of said conduit, and each having a circular cross-section at least in the plane perpendicular to the major axis of said conduit, the diameters of said circular cross-sections being smaller than the internal diameter of said conduit yet large enough to maintain the serial alignment of grinding media; and means for vibrating said conduit, thereby to bring said grinding media and the interior wall of said conduit into quickly repeated contacts with each other.

2. The mill of claim 1 in which the grinding media are short cylinders.

3. The mill of claim 1 in which the grinding media are balls.

4. The mill of claim 1 which includes a plurality of parallel conduit rigidly fastened to a support, with the vibrating means adapted to operate on the support.

5. The mill of claim 1 in which the angle at which the conduit slopes is adjustable.

6. The mill of claim 1 in which balls of substantially different sizes are used as the grinding media.

References Cited
UNITED STATES PATENTS

| | | | |
|---|---|---|---|
| 1,128,847 | 2/1915 | Garson | 241—175 X |
| 2,117,965 | 5/1938 | Kiesskalt | 241—175 |
| 3,215,354 | 11/1965 | Smith | 241—175 X |

ANDREW R. JUHASZ, *Primary Examiner.*

HARRY F. PEPPER, Jr., GERALD A. DOST,
*Examiners.*